US006728628B2

(12) United States Patent
Peterson

(10) Patent No.: US 6,728,628 B2
(45) Date of Patent: Apr. 27, 2004

(54) PORTABLE TRAFFIC INFORMATION SYSTEM

(75) Inventor: Ryan R. Peterson, Seattle, WA (US)

(73) Assignee: TrafficGauge, Inc., Seattle, WA (US)

(*) Notice: Subject to any disclaimer, the term of this patent is extended or adjusted under 35 U.S.C. 154(b) by 0 days.

(21) Appl. No.: 10/309,546

(22) Filed: Dec. 3, 2002

(65) Prior Publication Data

US 2003/0125867 A1 Jul. 3, 2003

Related U.S. Application Data

(60) Provisional application No. 60/344,572, filed on Dec. 28, 2001.

(51) Int. Cl.[7] ........................ G06F 19/00

(52) U.S. Cl. ........................ 701/117; 701/118; 701/212; 340/905

(58) Field of Search ........................ 701/117, 118, 701/119, 208, 212; 340/905

(56) References Cited

U.S. PATENT DOCUMENTS

| | | |
|---|---|---|
| 5,164,904 A | 11/1992 | Summer |
| 5,193,214 A | 3/1993 | Mardus et al. |
| 5,199,108 A | 3/1993 | Morgan et al. |
| 5,276,909 A | 1/1994 | Milner et al. |
| 5,289,184 A | 2/1994 | Suzuki |
| 5,732,324 A | 3/1998 | Rieger, III |
| 5,850,190 A | 12/1998 | Wicks et al. |
| 5,908,464 A | 6/1999 | Kishigami et al. |
| 6,081,200 A | 6/2000 | Park |
| 6,091,956 A * | 7/2000 | Hollenberg .............. 455/456.5 |

FOREIGN PATENT DOCUMENTS

| | | | |
|---|---|---|---|
| GB | 2208026 A * | 2/1989 | ............ G09G/3/00 |
| JP | 11042978 A * | 2/1999 | ........... B60R/11/02 |
| JP | 2001124581 A * | 5/2001 | ........... G01C/21/00 |

* cited by examiner

*Primary Examiner*—Gertrude A. Jeanglaude
(74) *Attorney, Agent, or Firm*—Graybeal Jackson Haley LLP

(57) ABSTRACT

The present invention provides a device, system, and method for a portable handheld device for displaying information. An embodiment of the invention provides a portable handheld device for displaying information, including traffic information. The portable device includes a wireless receiver arranged for receiving an information-data packet having at least one payload element, a translation table arranged for decoding a payload element, and a microcontroller including a memory and a processor, and which is operable to decode the at least one payload element. The device also includes an information viewing screen that includes an incorporated traffic map having road-display segments corresponding to selected roads and the visual display, the visual display having a plurality of individually controllable display elements corresponding to the road-display segments, each element corresponding to a road-display segment and being arranged to display a plurality of visual properties each representing a different traffic condition.

29 Claims, 8 Drawing Sheets

This example assumes that four data points are conditioned to represent one LCD segment. It is also assumed that there are a total of 8 segment on the LCD display. The input data has a range of 1 to 100 and is to be transformed into a value of 0, 1, 2 or 3.

PORTABLE TRAFFIC INFORMATION SYSTEM

This application claims the benefit of provisional application No. 60/344,572, filed Dec. 28, 2001.

SUMMARY

The present invention provides a device, system, and method for providing a portable handheld device for displaying information. An embodiment of the invention provides a portable handheld device for displaying information, including traffic information. The portable device includes a wireless receiver arranged for receiving an information-data packet having at least one payload element, a translation table arranged for decoding a payload element, and a microcontroller including a memory and a processor, and which is operable to decode the at least one payload element. The device also includes an information viewing screen that includes an incorporated traffic map having road-display segments corresponding to selected roads and the visual display, the visual display having a plurality of individually controllable display elements corresponding to the road-display segments, each element corresponding to a road-display segment and being arranged to display a plurality of visual properties each representing a different traffic condition.

The microcontroller may be further operable to decode at least one payload element in response to the grouping of bits within a payload element. The microcontroller may be further operable to decode at least one payload element in response to the grouping of bits within a payload element and the translation table. The information-data packet may include a plurality of payload elements arranged in a predetermined order. The microcontroller may be further operable to decode at least one payload element in response to the grouping of the payload elements. One payload element may include traffic information, and the translation table is a traffic-information translation table. The translation table may be arranged to decode traffic information encoded into one pair of bits for each road-display segment. A display element may include a liquid-crystal display (LCD), which may be a fixed-segment LCD. An unlit element may indicate no traffic congestion, a slow flash may indicate minor traffic congestion, a fast flash may indicate bad congestion, and a solid display may indicate severe traffic congestion. The receiver may be further arranged to receive the data packet from a pager service.

Another embodiment of the invention provides a method of displaying information in a portable handheld wireless receiver having a display. The method includes the steps of receiving an information-data packet having at least one payload element that includes traffic information, decoding a payload element, and displaying a traffic map having a plurality of fixed-road-display segments corresponding to selected roads, and further displaying a plurality of individually controllable display elements corresponding to the road-display segments, each element corresponding to a road-display segment and being arranged to display a plurality of visual properties each representing a different traffic condition. The decoding step may further include decoding traffic information in response to a traffic-information translation table. At least one payload element may have a predetermined size. At least one payload element may have a predetermined size, and wherein the decoding step may further include decoding in response to a grouping of bits within the payload element. At least one payload element may have a predetermined size and include traffic information encoded into one pair of bits per road-display segment, and the decoding step may further include decoding in response to a position of the pair of bits within the payload element. The data packet may include a plurality of payload elements in a predetermined order, and the decoding step may further include decoding in response to the order of the payload element. The receiving step may include further receiving the data packet from a pager service.

A further embodiment of the invention provides a method of providing information to a plurality of portable handheld wireless devices each having a display. The method including the steps of gathering data on selected information, including traffic information for reported road segments, conditioning the traffic information by reducing data for a predetermined number of reported road segments into one road-display segment, and encoding at least a portion of the gathered data. The method also includes creating an information-data packet having at least one payload element that includes traffic information, and causing the information-data packet to be transmitted to the plurality of wireless devices.

The conditioning step may further include the step of reducing four-reported road segments into one road-display segment. The traffic condition for a single-display road segment may be represented by a plurality of displayable levels. The encoding step may further include the step of encoding the conditioned traffic information in response to a traffic-information translation table. The encoding step may further include encoding the conditioned traffic information into a pair of bits for each road-display segment in response to a traffic-information translation table, the pair of bits representing four different levels of traffic congestion, and positioning pairs of bits may be in a predetermined order within a traffic-payload element. The each byte in the traffic payload element may contain traffic information for four road-display segments. The order of a pair of bits in each byte may determine the road-display segment for which the traffic information is being provided. The creating step may further include, within a payload element, grouping bits in a predetermined sequential order and assigning an information feature to each group of bits. The creating step may further include grouping bits of a traffic-information payload element into adjacent pairs, each pair of bits representing traffic information for one road-display segment, and the position of the pair of bits in the payload element determining which road-display segment is represented. The causing step further including causing the data packet to be transmitted over a pager system.

In a yet further embodiment, a computer-implemented system configured for providing information to a plurality of portable handheld wireless devices is provided. The system including a computer having at least one processor and data storage, and an Internet connection to the World Wide Web. The system further including a plurality of processes spawned by the at least one processor, the processes including gathering data on selected information from the World Wide Web, including traffic information for reported road segments, conditioning the traffic information by reducing data for a predetermined number of reported road segments into one road-display segment, encoding at least a portion of the gathered data, creating an information-data packet having at least one payload element that includes traffic information, and causing the information-data packet to be transmitted to the plurality of wireless devices.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawings, in the several figures of which like referenced numerals identify like elements, and wherein:

DETAILED DESCRIPTION

In the following detailed description of exemplary embodiments of the invention, reference is made to the accompanying drawings, which form a part hereof. The detailed description and the drawings illustrate specific exemplary embodiments by which the invention may be practiced. These embodiments are described in sufficient detail to enable those skilled in the art to practice the invention. It is understood that other embodiments may be utilized, and other changes may be made, without departing from the spirit or scope of the present invention. The following detailed description is therefore not to be taken in a limiting sense, and the scope of the present invention is defined by the appended claims.

The meaning of "a", "an", and "the" include plural references. The meaning of "in" includes "in" and "on." Additionally, a reference to the singular includes a reference to the plural unless otherwise stated or inconsistent with the disclosure herein.

Unless specifically stated otherwise as apparent from the following discussions, it is appreciated that throughout the present invention, discussions utilizing terms such as "processing" or "computing" or "calculating" or "determining" or "displaying" or the like, refer to the action and processes of an electronic computing device, such as a computer system or similar device, that manipulates and transforms data represented as physical (electronic) quantities within the computer system's registers and memories into other data similarly represented as physical quantities within the computer system memories or registers or other such information storage, transmission or display devices.

Figure 1:
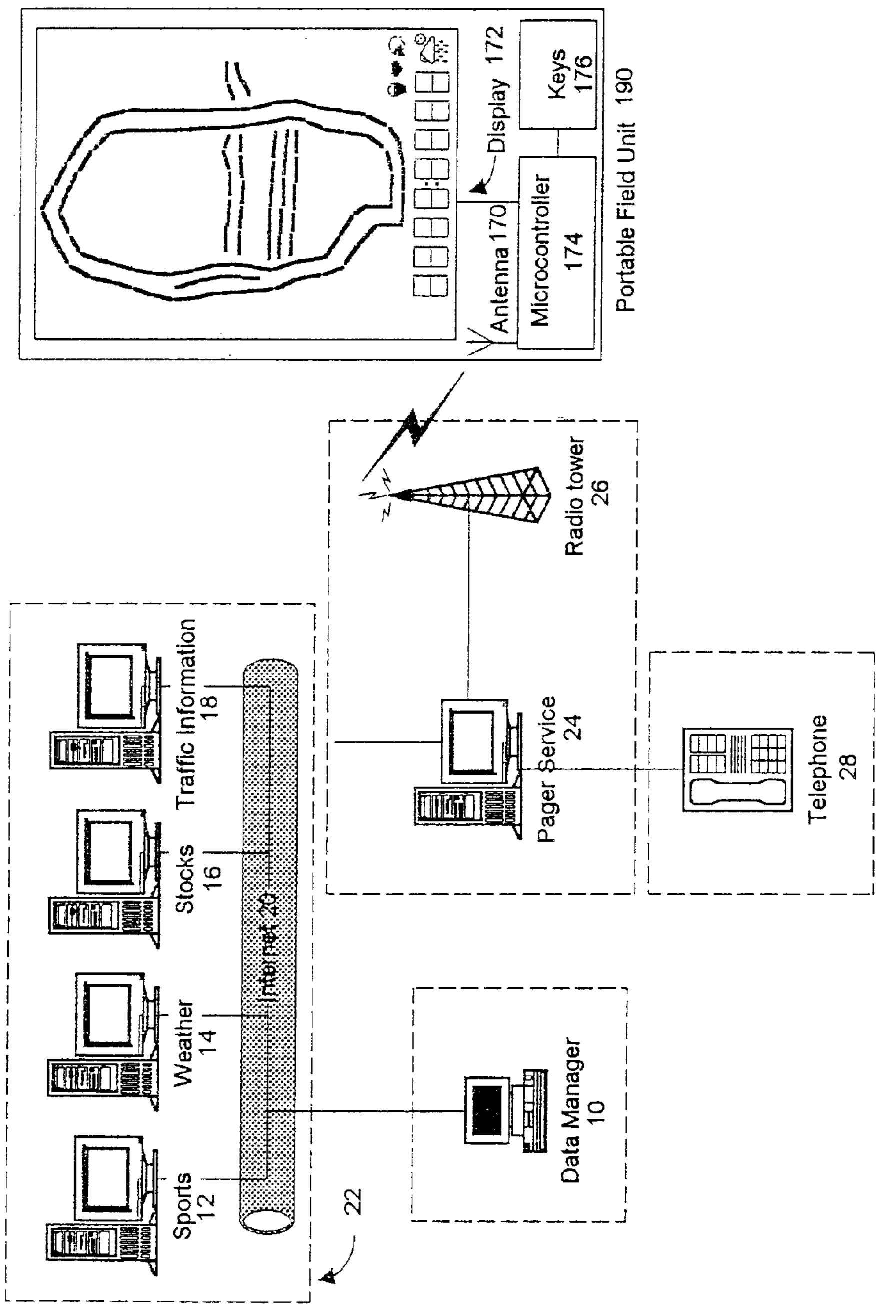
FIG. 1 is a block diagram of the key components of the system embodying the present invention.

The present invention relates to a system that retrieves data from the Internet, including traffic and other miscellaneous datum, and sends it to portable field units, which are portable handheld wireless receivers or devices arranged for displaying information. FIG. 1 illustrates a system embodying the invention which generally includes Internet resources 22, a data manager 10 embodying particular aspects of the invention, a standard one-way pager service 24, a radio tower 26 associated with pager service 24, a standard telephone 28, and field units 190 embodying particular aspects of the invention, and according to an embodiment of the invention.

The Internet resources 22 provide the data to be sent to the field units 190. Internet resources are servers coupled to the Internet 20. They include a sports server 12, a weather server 14, a stock market server 16, and a traffic-information server 18. The Internet services provided are conventional and well known in the art. The data manager 10 is coupled to the Internet and retrieves information from the Internet resources 22. The data manager 10 then compresses the retrieved data and sends the data via the Internet 20 to the paging-service provider 24. The paging service 24 sends this information to a radio tower 26, which subsequently broadcasts data to the field units 190. As is known in the prior art, the pager service may acquire sports, market, weather and traffic information and transmit the data to text-display pagers. In accordance with the present invention, the data manager 10 gets sports, market, weather and traffic information and sends it to the paging service. The pager service 24 also provides a telephone interface 28 which allows individuals to enter a numeric page which is subsequently sent to the radio tower 26 and sent to field units of a particular address.

The field unit 190 receives data transmitted from radio tower 26 via an antenna 170. The antenna is coupled to a microcontroller 174 which decodes the received data and manages peripherals. A display 172, which may be a fixed-segment (LCD), is coupled to the microcontroller and displays the received information. Traffic information may be constantly displayed on the display while other data is selectable via keys 176 which facilitate navigation and selection of provided information.

Figure 2:
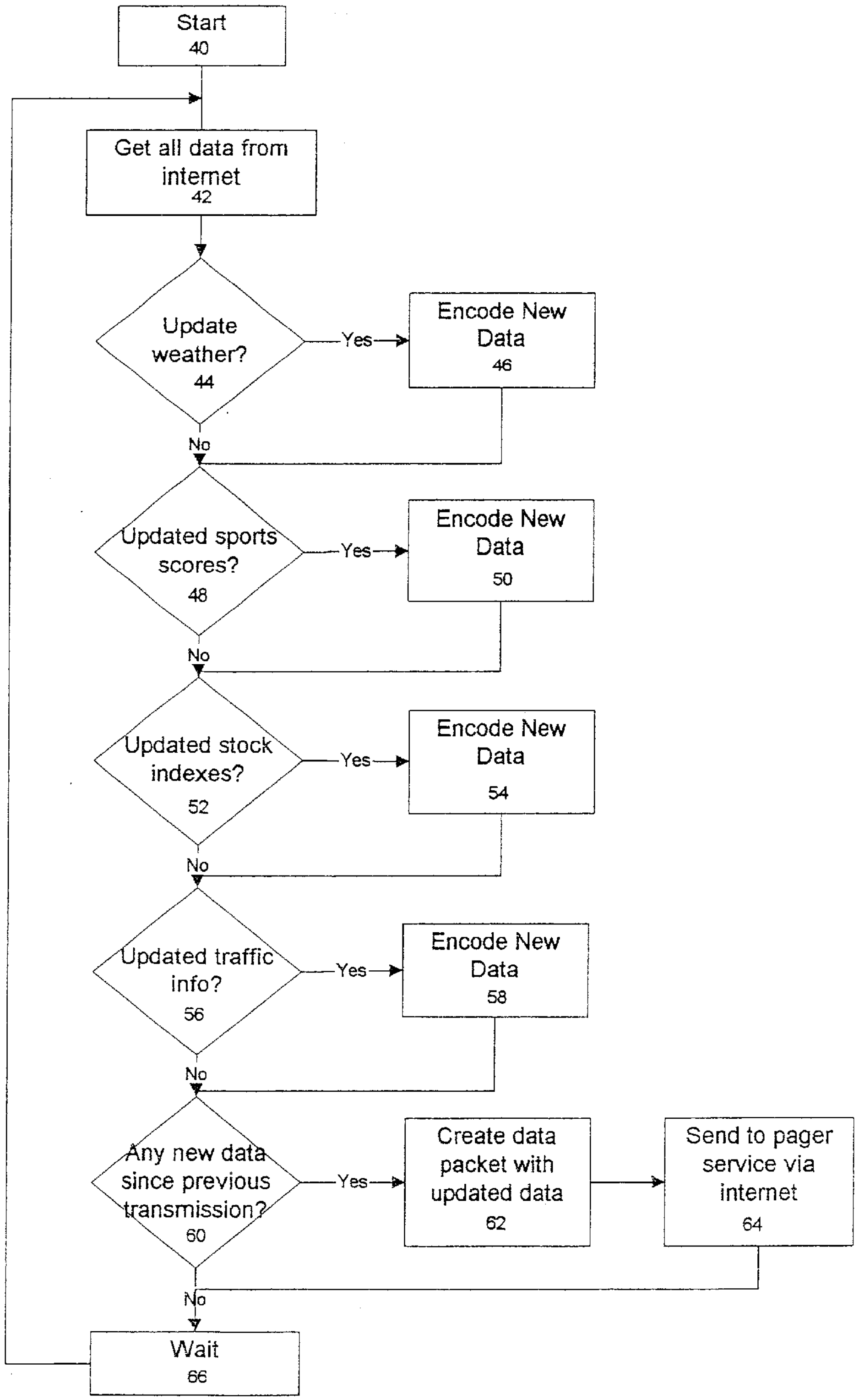
FIG. 2 is a flow diagram of the process used to convert information received from the Internet into a format readable by the field unit, according to an embodiment of the invention.

FIG. 2 illustrates the operation of the data manager 10 that gathers and compresses data from the Internet and sends it to the paging service, according to an embodiment of the invention. Once the data manager is started at step 40, it connects to the Internet and receives data from the Internet resources 22 in step 42. The data manager 10 checks if the weather information has been updated since the last retrieval of Internet information at step 44. If it is updated, the weather data is encoded in step 46. The encoded weather data may contain five days of weather information including high and low temperatures and data-encoding information for iconic display of either: sun, sun/cloud, sun/cloud/rain, or rain. The next step 48 determines whether the sports information has been updated since the last retrieval of Internet information. If it is updated, the data is encoded in step 50. The encoded sports scores may include several local team's scores. The next step 52 determines whether the stock information has been updated since the last retrieval of Internet information. If it is updated, the data is encoded in step 54. The stock-index values may include values for the NASDAQ, DJIA and S&P 500. The next step 56 determines whether the traffic information has been updated since the last retrieval of Internet information. If it is updated, the data is encoded in step 58. The next step 60 determines whether any data has been encoded or updated since the last data transmission. If it has, then a data packet is created in step 62 and sent to the paging service via the Internet in step 64. Next the system delays processing in step 66 for a fixed amount of time and then starts over by repeating step 42 for receiving data from the Internet.

Figure 3:
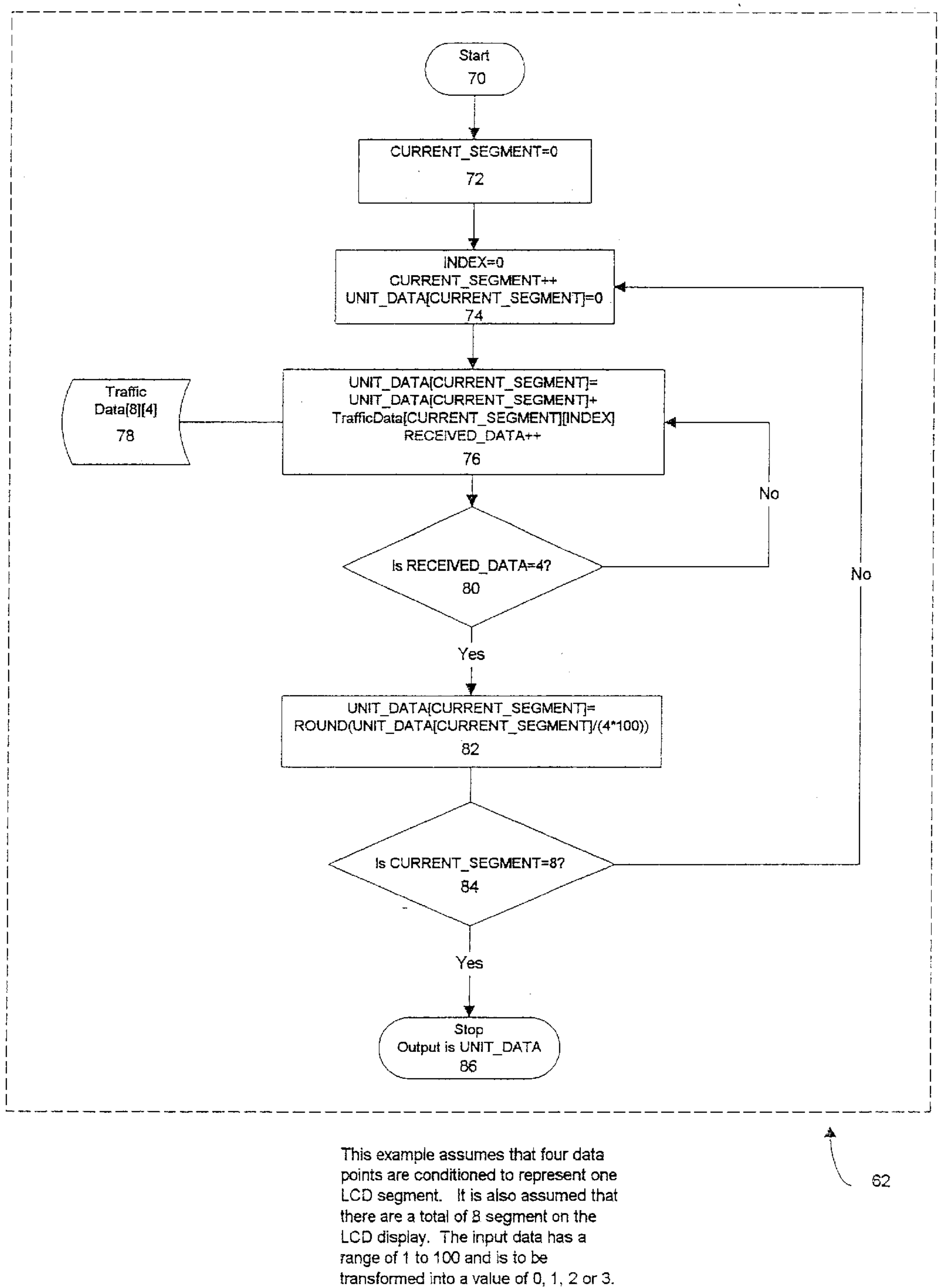
FIG. 3 is a more detailed flow diagram of a process of FIG. 2, which illustrates a detailed example of the conversion of Internet traffic data into field-unit format data, according to an embodiment of the invention.

FIG. 3 illustrates a more detailed process for the traffic data encoding step 58 of FIG. 2, according to an embodiment of the invention. Traffic information from the Internet typically includes traffic congestion for numerous segments of the highway system. The encoding process of step 62 may reduce the number of traffic segments sent to the field unit 190 to achieve greater usability by employing a method of averaging to reduce the number of segments necessary to easily communicate traffic conditions. Encoded traffic information may be tightly compacted into two bits per highway segment. This encoding signifies four different levels of congestion to the pager, and efficiently compacts four segments into one byte. Each geography where this system can be used has unique challenges that might require different encoding algorithms. FIG. 3 provides an example.

In the example of FIG. 3, four data points received from the traffic-information service 18 are conditioned to represent one LCD segment. Furthermore, the data received from the traffic information service 18 ranges in value between 1 and 100 and is converted by this process to values between and including 0 and 3. The process starts in step 70 and sets a variable called CURRENT_SEGMENT to 0 in step 72. This variable keeps track of what segment is currently being encoded. The next step 74 increments CURRENT_SEGMENT, sets INDEX to 0 which indicates which one of the four raw-data points is being accessed and sets UNIT_DATA[CURRENT_SEGMENT] to 0 to initialize a variable to be used for generating output. Process 76 gets data from the data manager's 10 stored traffic data 78. Process 76 then adds the current data for the current index and segment to the variable UNIT_DATA [CURRENT_SEGMENT]. After the addition, RECIEVED_DATA is incremented. This process is repeated four times per segment as process 80 dictates. After exiting process 80, UNIT_DATA contains the summation of four segments which are being combined to represent one LCD segment. Process 82 divides the current UNIT_DATA value by 400 and rounds the result. This value then ranges inclusively between 0 and 3. Process 84 causes the foregoing process to be repeated eogjt times for the eogjt LCD segments. Upon exiting, process 86 returns the eight LCD segments values in the array UNIT_DATA.

Figure 4:
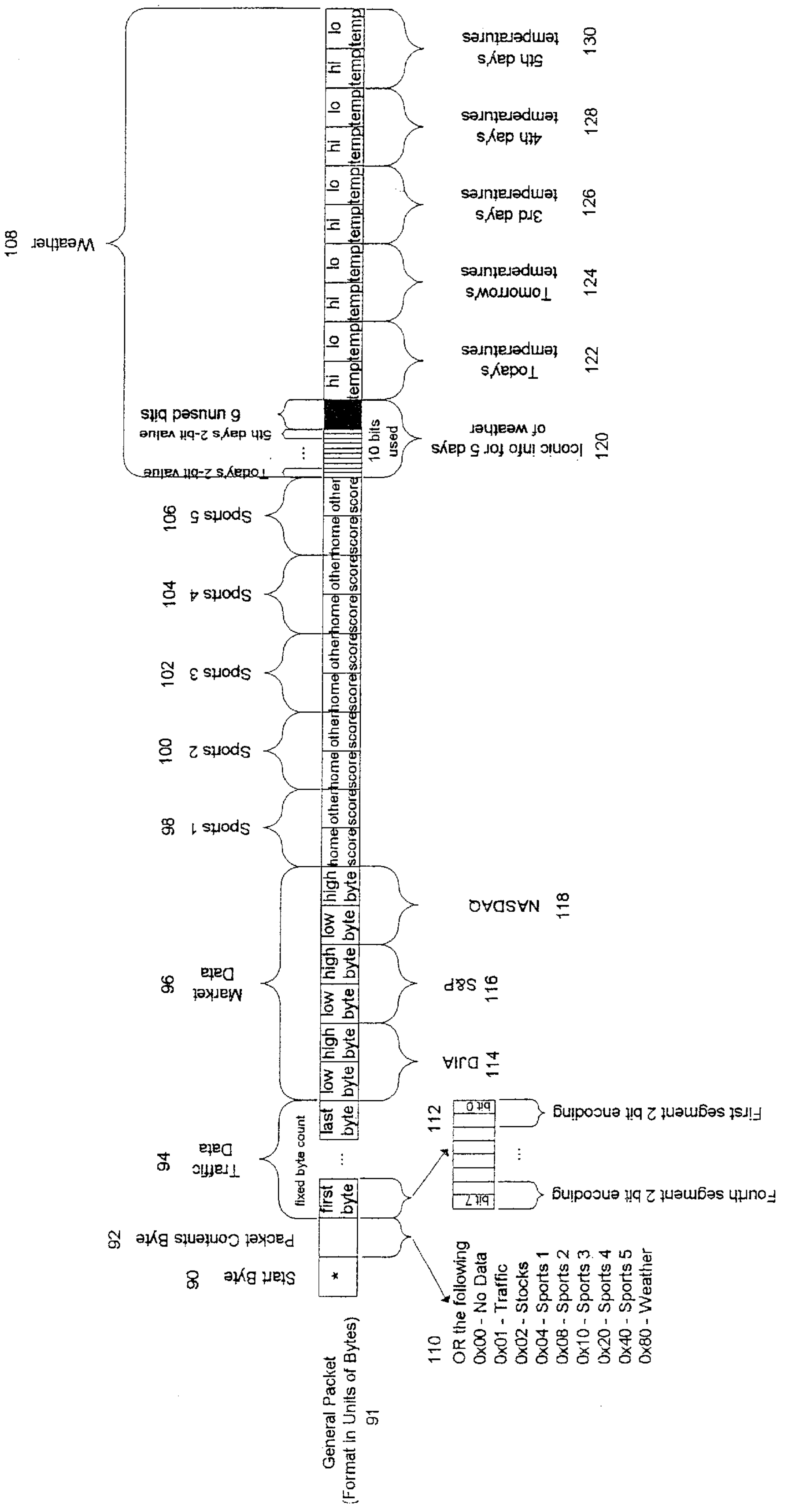
FIG. 4 is a description of a general data packet that is received by the field unit, according to an embodiment of the invention.

FIG. 4 illustrates an example of a data packet created through the data-encoding process described with respect to FIG. 3 and which is to be sent to the field unit via radio tower 26, according to an embodiment of the invention. The data packet contains an initial byte 90 that identifies this packet The example uses the ASCII character '★' for the start byte 90. The packet contents byte 92 identifies the data contained in the packet. This byte is used so that only the newly updated information categories are updated. Each enabled bit of byte 92 indicates the data to be included in the packet 91, as defined in a packet-lookup table 110. Bitwise ORing the values of 110 associated with the included data results in the value of byte 92. For example, if the value of byte 92 is 0×01, only the traffic data is contained in the packet 91. A value of 0×81 indicates both weather and traffic. Traffic data 94 may be a fixed number of bytes used to encode traffic data. The format for the traffic data bytes may follow the format shown at 112. Byte 112 contains data which encodes four LCD segments with four discrete values. Encoding traffic data is achieved by pairing adjacent bits starting with bits 0 and 1 and ending with the bit pair 6 and 7. Market data 96 includes and encodes the Dow Jones Industrial Average 114, the S&P 500 index 116 and the NASDAQ index 188. Each of the market indicators is encoded in two bytes which supports values up to 65,535 for each market value via binary representation. The sports data packets 98, 100, 102, 104, and 106 are associated with unique sports teams. Each sports data packet contains the home-team score and the competitor score encoded in individual bytes resulting in scores up to 255 for each team. The weather data 108 contains weather-forecast data. The two bytes shown as item 120 contain five sets of two bits to encode iconic weather symbols representing the weather for each of five days. With two bits per icon, one of four icons can be encoded. For example, these bits could encode: a sun icon, a cloudy icon, a rainy icon, and a partly sunny icon. The forecasted data 122, 124, 126, 128 and 130 contains high and low temperatures for each forecasted day. Each day's high and low temperatures may be encoded using sign-magnitude representation allowing temperature values between −127 and 127.

Figure 5:
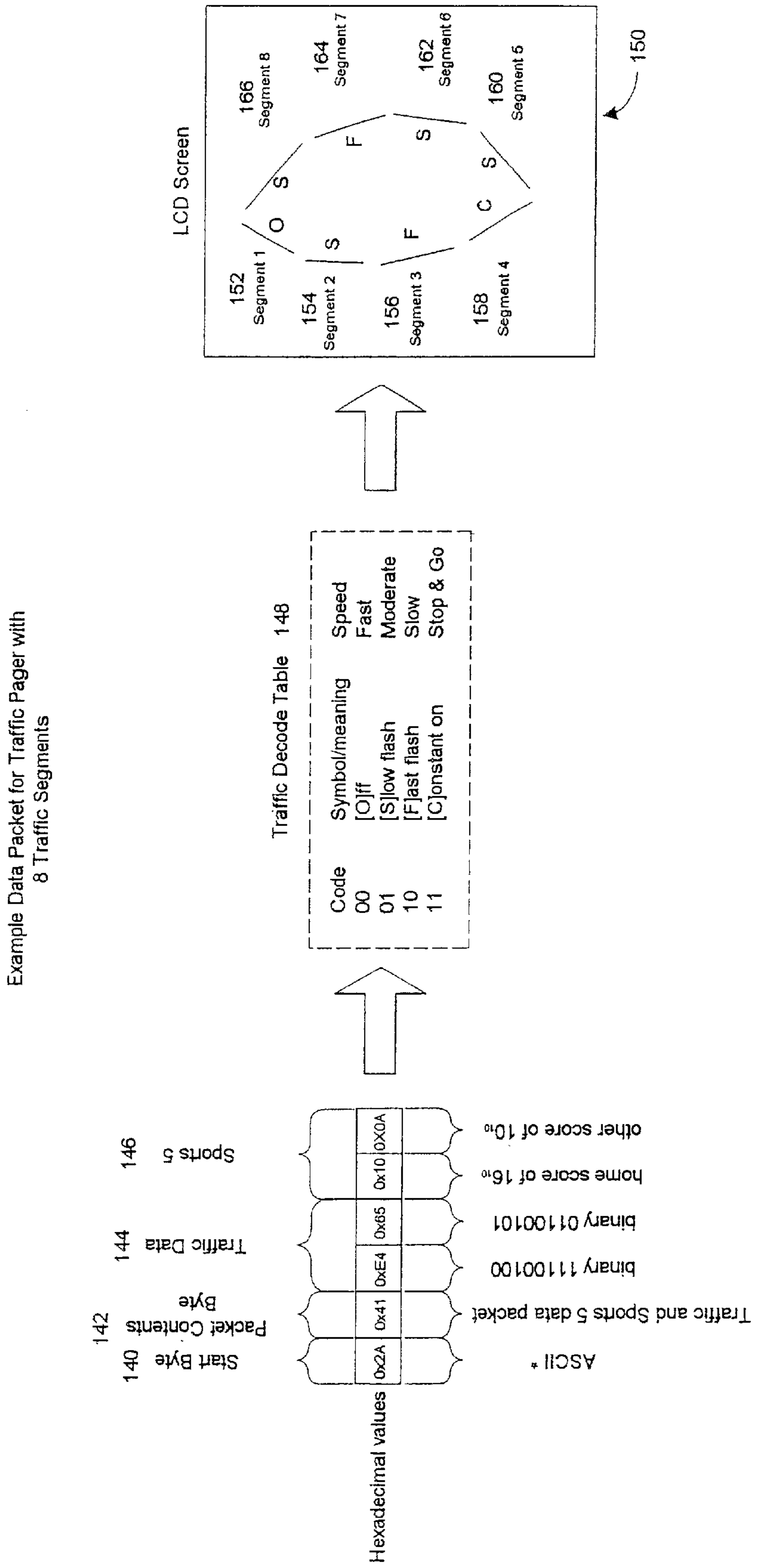
FIG. 5 is a specific example of a data packet described in FIG. 4, according to an embodiment of the invention.

FIG. 5 illustrates an example data packet in the format specified in data packet 91, according to an embodiment of the invention. The start byte 140 is the ASCII '★' which is 0×2A. The contents packet 142 contains 0×41 which, using table 110 to decode it, contains traffic and Sports 5 data. Eight traffic LCD segments which are contained in the two bytes of traffic data 144 are encoded. The sports information is contained in byte 146. The traffic translation table 148 shows what each of the pairs of traffic encode/decode data translates to in terms of how the display segment acts (off, slow flash, fast flash, or solid on). Each segment is shown in LCD screen 150 and their display characteristics are defined in table 148 as one of four possible LCD states. For example, the first two bits of the first byte of traffic data 144 correspond to segment 1 and are of the value binary 00. The decode table 148 indicates that binary 00 indicates the LCD segment is off and the symbolized for descriptive purposes as 'O'. Segment 1 152 has an 'O' adjacent to it to indicate that the segment is off. The remaining bits follow this pattern. The sports data is simply binary represented and therefore the home score 146 of 0×10 is equivalent to decimal 16 and the competitor score of 0×0A is equivalent to decimal 10.

Figure 6:
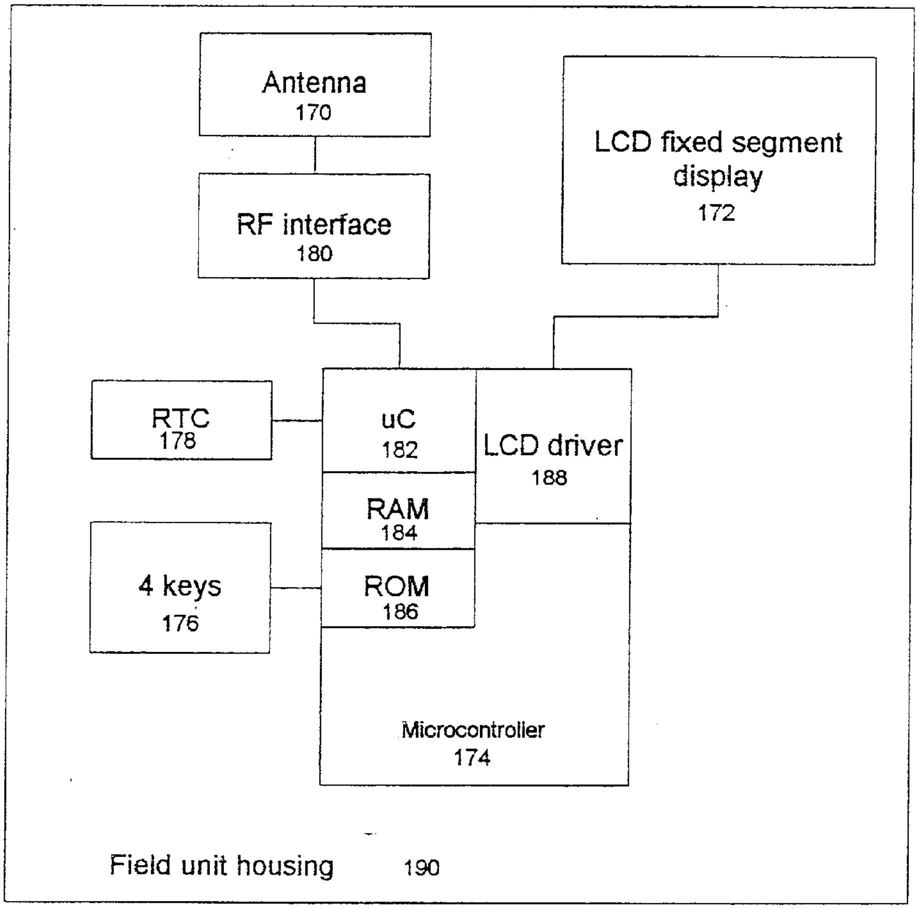
FIG. 6 is a functional block diagram of the field unit of the present invention, according to an embodiment of the invention.

FIG. 6 is a functional block diagram of an implementation of the portable field unit 190 (also referred to herein as "portable handheld wireless device"), according to an embodiment of the invention. The field unit 190 is a portable handheld wireless receiver for displaying information, including traffic information. The components of the unit 190 may be housed in a hand-holdable plastic enclosure dimensioned for single-handed use with a visible LCD display 172. The antenna 170 receives the transmitted data from the radio tower 26 and sends the received signal to the RF interface 180 for signal conditioning including analog-signal to digital-signal conversion. The digital signal provided by the RF interface 180 is coupled to the microcontroller 174. The microcontroller 174 may include a microprocessor 182, Random Access Memory (RAM) 184, Read-Only Memory (ROM) 186 and a LCD driver 188. A real-time clock 178 is coupled to the microcontroller 174 to provide time functionality. Also, the microcontroller is coupled to a user interface 176 which includes four keys. The interface 176 facilitates navigation through the selection of provided information. The display 172 may be a fixed-segment LCD display providing a static map and an area for variable numeric information and icons.

Figure 7:
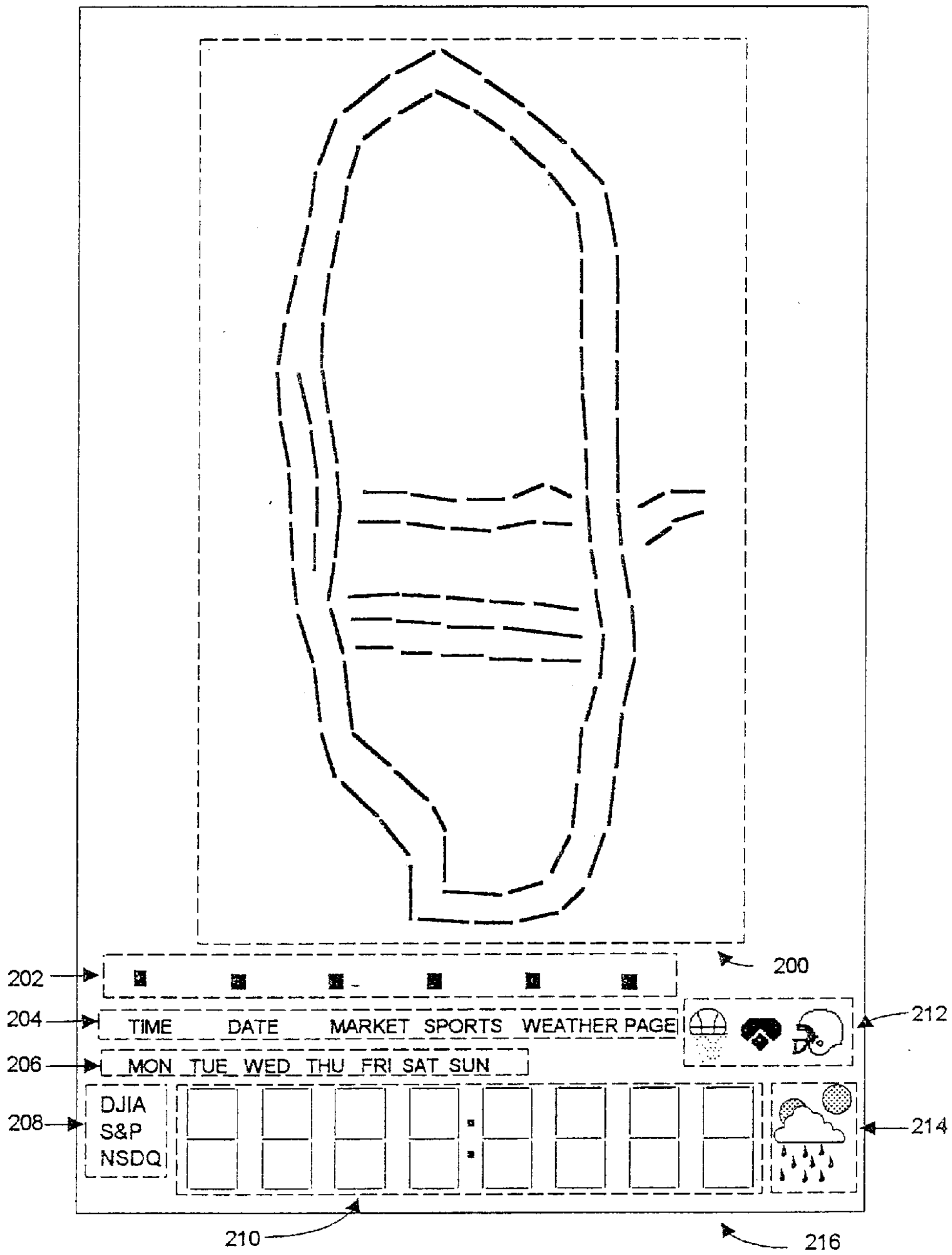
FIG. 7 is an example of the LCD segments of a field unit, according to an embodiment of the invention.

FIG. 7 illustrates an example information-viewing screen, hereafter referred to as a traffic-pager LCD screen 216, containing enough LCD segments to visually represent all the data contained in packet 91, according to an embodiment of the invention. The traffic-pager LCD screen 216 includes a screen portion 200 that further includes a local traffic map having road-display segments corresponding to selected local roads of the region in which the portable field unit will be used. The screen portion 200 illustrates segments used to display traffic congestion. In an embodiment, the field unit 190 is localized with the local traffic map incorporated into the screen portion 200. For example, a field unit 190 localized for the greater Seattle region may use a local traffic map incorporated into the screen portion 200 similar to that illustrated FIG. 7. A field unit 190 localized for another region, such as Los Angeles, Tokyo, or London, for example, would have a different local traffic map incorporated into its screen portion 200. The local traffic map may be incorporated into the traffic-pager LCD screen 216 in any manner known in the art, including printing the local traffic map to lie underneath the LCD and be viewable.

A local highway system is presented as many fixed-line segments that are individually controlled to convey traffic information. For example, in an embodiment, a line segment not lit indicates no traffic problem, a slow flash indicates minor traffic congestion, a fast flash indicates bad congestion and a solid display indicates severe traffic congestion. Likewise, a colored LCD may be used to communicate varying traffic conditions. All data, other than that displayed in portion 200, is selected by the keys 176. Screen portion 204 contains constantly lit menu headers that indicate what content is being displayed by marks in screen portion 202. If, for example, time is selected, the time will appear in the numeric screen portion 210. By selecting date, the date will appear in portion 210. By selecting market, the select keys enable one item of 208 possible items to be displayed with the corresponding data. By selecting sports, the select keys enable one item of 212 possible items to be displayed with the corresponding data. By selecting weather, the select keys enable one item of 206 possible items to be displayed with the corresponding data in portion 210 and icons in portion 214. By selecting page, the select keys may be used to scroll through received pages displayed in portion 210 and allow for deletion of current-page display. This method of displaying traffic data is unique in that LCD segments are being used to provide at-a-glance information of a large geographic area at a cost savings.

Figure 8:
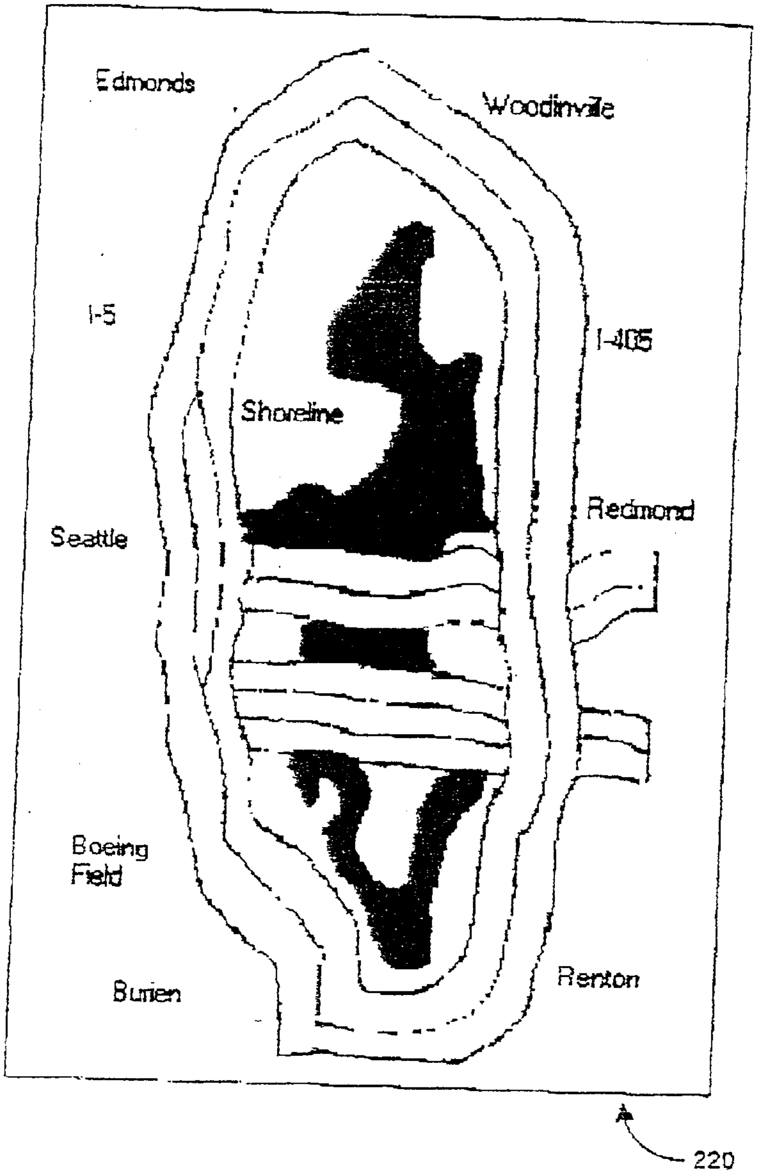
FIG. 8 is an example of a printed map that sits behind the LCD display to give boundaries to unlit LCD segments, according to an embodiment of the invention.

FIG. 8 shows a printed map 220 that may lie behind the LCD to illustrate the road boundaries of the LCD screen and other geographic markers including cities and lakes. The map serves the purpose of defining roadways when an LCD segment is not lit.

The invention thus provides a system for retrieving data from Internet sources and transmitting the data to customized handheld devices for providing road-traffic information discernable with at-a-glance ease. The information may be made available anywhere within the geographical coverage of the system.

The preceding description has been presented only to illustrate and describe the invention. It is not intended to be exhaustive or to limit the invention to any precise form disclosed. Many modifications and variations are possible in light of the above teaching.

The described invention was chosen to explain the principles of this invention. The preceding description is intended to enable those skilled in the art to best utilize the invention in various embodiments and with various modifications as are suited to this particular use contemplated.

What is claimed is:

1. A portable handheld device for displaying information including traffic information, the device comprising:

a wireless receiver arranged for receiving an information-data packet having at least one payload element;

a translation table arranged for decoding a payload element;

a microcontroller including a memory and a processor, and which is operable to decode the at least one payload element; and an information viewing screen that includes an incorporated traffic map having road-display segments corresponding to selected roads and the visual display, the visual display having a plurality of individually controllable display elements corresponding to the road-display segments, each element corresponding to a road-display segment and being arranged to display a plurality of visual properties each representing a different traffic condition.

2. The device of claim 1, wherein the microcontroller is further operable to decode at least one payload element in response to the grouping of bits within a payload element.

3. The device of claim 1, wherein the microcontroller is operable to decode at least one payload element in response to the grouping of bits within a payload element and the translation table.

4. The device of claim 1, wherein the information-data packet includes a plurality of payload elements arranged in a predetermined order.

5. The device of claim 4, wherein the microcontroller is further operable to decode at least one payload element in response to the grouping of the payload elements.

6. The device of claim 1, wherein one payload element includes traffic information and the translation table is a traffic-information translation table.

7. The device of claim 1, wherein the translation table is arranged to decode traffic information encoded into one pair of bits for each road-display segment.

8. The device of claim 1, wherein a display element includes a liquid-crystal display.

9. The device of claim 8, wherein the liquid-crystal display is a fixed-segment liquid-crystal display.

10. The device of claim 1, wherein an unlit element indicates no traffic congestion, a slow flash indicates minor traffic congestion, a fast flash indicates bad congestion, and a solid display indicates severe traffic congestion.

11. The device of claim 1, wherein the receiver is further arranged to receive the data packet from a pager service.

12. A method of displaying information in a portable handheld wireless receiver having a display, the method comprising the steps of:

receiving an information-data packet having at least one payload element that includes traffic information;

decoding a payload element;

displaying a traffic map having a plurality of fixed road-display segments corresponding to selected roads, and further displaying a plurality of individually controllable display elements corresponding to the road-display segments, each element corresponding to a road-display segment and being arranged to display a plurality of visual properties each representing a different traffic condition.

13. The method of claim 12, wherein the decoding step further includes decoding traffic information in response to a traffic-information translation table.

14. The method of claim 12, wherein at least one payload element has a predetermined size.

15. The method of claim 12, wherein at least one payload element has a predetermined size, and wherein the decoding step further includes decoding in response to a grouping of bits within the payload element.

16. The method of claim 12, wherein at least one payload element has a predetermined size and includes traffic information encoded into one pair of bits per road-display segment, and the decoding step further includes decoding in response to a position of the pair of bits within the payload element.

17. The method of claim 12, wherein the data packet includes a plurality of payload elements in a predetermined order, and wherein the decoding step further includes decoding in response to the order of the payload element.

18. The method of claim 12, wherein the receiving step includes further receiving the data packet from a pager service.

19. A method of providing information to a plurality of portable handheld wireless devices each having a display, the method comprising the steps of:

gathering data on selected information, including traffic information for reported road segments;

conditioning the traffic information by reducing data for a predetermined number of reported road segments into one road-display segment;

encoding at least a portion of the gathered data;

creating an information-data packet having at least one payload element that includes traffic information; and causing the information-data packet to be transmitted to the plurality of wireless devices.

20. The method of claim 19, wherein the conditioning step further includes the step of reducing four-reported road segments into one road-display segment.

21. The method of claim 20, wherein the traffic condition for a single display road segment is represented by a plurality of displayable levels.

22. The method of claim 19, wherein the encoding step further includes the step of encoding the conditioned traffic information in response to a traffic-information translation table.

23. The method of claim 19, wherein the encoding step further includes encoding the conditioned traffic information into a pair of bits for each road-display segment in response to a traffic-information translation table, the pair of bits representing four different levels of traffic congestion, and positioning pairs of bits in a predetermined order within a traffic-payload element.

24. The method of claim 23, wherein each byte in the traffic-payload element contains traffic information for four road-display segments.

25. The method of claim 23, wherein the order of a pair of bits in each byte determines the road-display segment for which the traffic information is being provided.

26. The method of claim 19, wherein the creating step further includes, within a payload element, grouping bits in a predetermined sequential order and assigning an information feature to each group of bits.

27. The method of claim 19, wherein the creating step further includes grouping bits of a traffic information payload element into adjacent pairs, each pair of bits representing traffic information for one road-display segment, and the position of the pair of bits in the payload element determining which road-display segment is represented.

28. The method of claim 19, wherein the causing step further includes causing the data packet to be transmitted over a pager system.

29. A computer-implemented system configured for providing information to a plurality of portable handheld wireless devices, the system comprising:

a computer having at least one processor and data storage;

an Internet connection to the World Wide Web;

a plurality of processes spawned by the at least one processor, the processes including:

gathering data on selected information from the World Wide Web, including traffic information for reported road segments;

conditioning the traffic information by reducing data for a predetermined number of reported road segments into one road-display segment;

encoding at least a portion of the gathered data;

creating an information-data packet having at least one payload element that includes traffic information; and causing the information-data packet to be transmitted to the plurality of wireless devices.

* * * * *